United States Patent [19]
Nakane

[11] Patent Number: 5,097,700
[45] Date of Patent: Mar. 24, 1992

[54] APPARATUS FOR JUDGING CATALYST OF CATALYTIC CONVERTER IN INTERNAL COMBUSTION ENGINE

[75] Inventor: Hiroaki Nakane, Anjo, Japan

[73] Assignee: Nippondenso Co., Ltd., Kariya, Japan

[21] Appl. No.: 661,127

[22] Filed: Feb. 27, 1991

[30] Foreign Application Priority Data

Feb. 27, 1990 [JP] Japan ................................. 2-46579

[51] Int. Cl.$^5$ .............................................. G01M 19/00
[52] U.S. Cl. .................................................... 73/118.1
[58] Field of Search ...................... 173/118.1; 60/277; 364/431.01

[56] References Cited

FOREIGN PATENT DOCUMENTS 61-286550 12/1986 Japan .
63-231252 9/1988 Japan .
 232106 9/1989 Japan ..................................... 60/277

Primary Examiner—Jerry W. Myracle
Attorney, Agent, or Firm—Cushman, Darby & Cushman

[57] ABSTRACT

An apparatus for judging of a catalyst of a catalytic converter provided in an exhaust system of an internal combustion engine so as to purify an exhaust gas generated from the internal combustion engine. The apparatus is arranged to be responsive to the output signal of a gas concentration sensor provided downstream of the converter to detect a concentration of a specified component of the exhaust gas. Included in the apparatus is a judgment unit responsive to the output signal therefrom so as to judge the catalyst of the catalytic converter on the basis of the output signal therefrom. The judgment unit compares a predetermined judgment threshold with an amplitude of the output signal therefrom to detect, on the basis of the comparison result, whether the catalyst of the converter is in a deteriorated state. The judgment unit relatively corrects the predetermined judgment threshold with respect to the output signal on the basis of the difference between the output signal therefrom under the condition that an air-fuel ratio is in a predetermined rich state and the output signal therefrom under the condition that the air-fuel ratio is in a predetermined lean state. This arrangement allows accurate detection of the deterioration of the catalyst irrespective of the deterioration of the gas concentration sensor itself.

7 Claims, 7 Drawing Sheets

APPARATUS FOR JUDGING CATALYST OF CATALYTIC CONVERTER IN INTERNAL COMBUSTION ENGINE

BACKGROUND OF THE INVENTION

The present invention relates to an apparatus for judging a catalyst of a catalytic converter for exhaust gas clarification with respect to deterioration, the catalytic converter being provided in an exhaust system of an internal combustion engine.

An apparatus for detecting deterioration of a catalyst of a catalytic converter provided in an exhaust system of an internal combustion engine is disclosed in the Japanese Patent Provisional Publication No. 61-286550, the technique of which involves comparing a predetermined threshold for judgment of catalyst deterioration with the output signal of an $O_2$ sensor provided at a downstream side of the catalytic converter. There is a problem which arises with such an apparatus, however, in that, because of the detection based upon the comparison of the output signal with the threshold fixed, the detection of the catalyst deterioration can be accompany of detection errors irrespective of the catalyst itself being still usable at that time if the $O_2$ sensor itself is deteriorated. In other words, since the output signal of the $O_2$ sensor is compared with the predetermined threshold, which is constant and fixed, for the catalyst deterioration detection purpose, difficulty is encountered to adequately judge between the deterioration of the catalyst and the deterioration of the $O_2$ sensor.

SUMMARY OF THE INVENTION

It is therefore an object of the present invention to provide an apparatus for accurately judging the catalyst of the catalytic converter in an internal combustion engine with respect to deterioration with no affection of the property variation of the gas concentration sensor.

According to this invention, there is provided an apparatus for judging of a catalyst of a catalytic converter provided in an exhaust system of an internal combustion engine so as to purify an exhaust gas generated from the internal combustion engine, the apparatus is arranged to be responsive to the output signal of gas concentration sensor means provided at a downstream of the catalytic converter to detect a concentration of a specified component of the exhaust gas. The apparatus includes judgment means which is responsive to the output signal from the gas concentration sensor means to compare a predetermined judgment threshold with an amplitude of the output signal therefrom to detect, on the basis of the comparison result, whether said catalyst of said catalytic converter is in a deteriorated state. The judgment means relatively corrects said predetermined judgment threshold with respect to the output signal from the gas concentration sensor means on the basis of the output signal therefrom under a predetermined air-fuel ratio condition.

It is also preferable that the judgment means is arranged to relatively correct the predetermined judgment threshold with respect to the output signal from the gas concentration sensor means on the basis of the difference between the output signal therefrom under the condition that an air-fuel ratio for the internal combustion engine is in a predetermined rich state and the output signal therefrom under the condition that the air-fuel ratio is in a predetermined lean state. The predetermined rich state is taken when an output of the internal combustion engine is increasing, and the predetermined lean state is taken when supply of a fuel to the internal combustion engine is stopped.

Thus, according to this arrangement, the judgment threshold can be corrected so as to cancel the affection of the property variation of the gas concentration sensor, thereby accurately detecting the deterioration of the catalyst of the catalytic converter irrespective of the deterioration of the gas concentration sensor itself.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
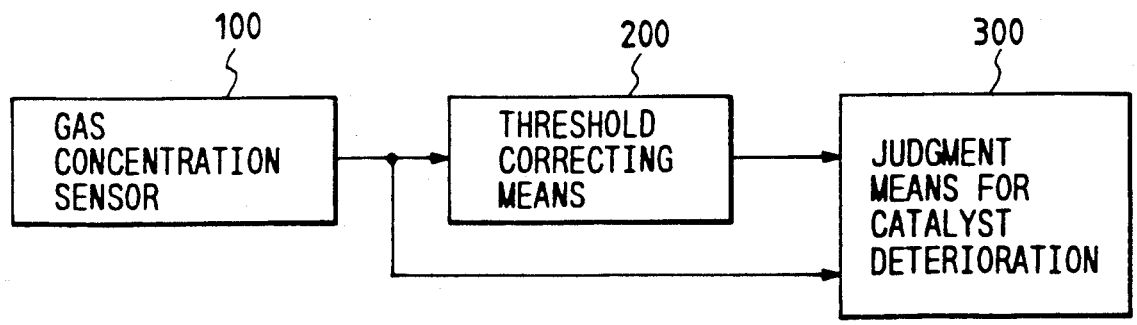
FIG. 1 is a block diagram showing an basic arrangement of a judgment apparatus according to the present invention.

Referring now to FIG. 1, there is illustrated a basic arrangement of an judgment apparatus according to an embodiment of this invention provided in an internal combustion engine in order to judge a catalyst of a catalytic converter disposed in an exhaust system of the internal combustion engine, where there are provided a gas concentration sensor 100, a threshold correcting means 200 and a judgment means 300. In response to the output signal from the gas concentration sensor 100, the threshold correcting means 200 corrects the threshold for the judgment of the catalyst with respect to the output signal of the gas concentration sensor 100 being constant, or corrects the output signal of the gas concentration sensor 100 with respect to the threshold being constant. Here, it is also appropriate to correct both the output signal of the gas concentration sensor 100 and threshold for the judgment of the catalyst in terms of deterioration. The judgment means 300 judges the catalyst of the catalytic converter with respect to the deterioration on the basis of the output signal of the gas concentration sensor 100 and the output signal, i.e., judgment result, of the threshold correcting means 200. The threshold correcting means stores as a minimum value the output signal value of the gas concentration sensor 100 which is obtained in a state (for example, a fuel-cut state) that the concentration of a specified gas or component of the exhaust gas is clearly lean, and further stores as a maximum value the output signal value of the gas concentration sensor 100 which is obtained in a state (for example, a completely throttle-opened state or an engine-output increasing state) that the concentration of a specified gas or component of the exhaust gas is clearly rich, thereby calculating the judgment threshold on the basis of the minimum value and/or the maximum value, for example, on the basis of the difference therebetween.

Figure 2:
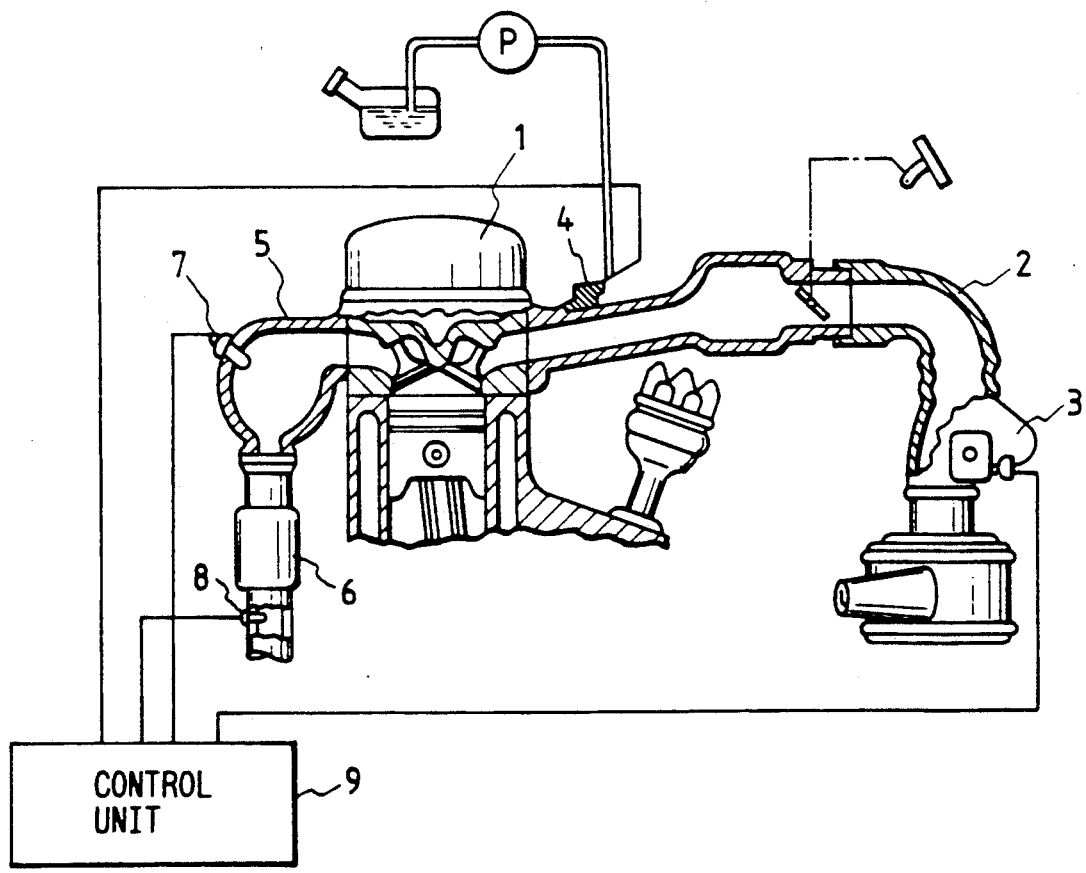
FIG. 2 is an illustration of a judgment apparatus of this invention which is incorporated into a double $O_2$-sensor type air-fuel ratio feedback control system.

A description will be described hereinbelow with reference to the drawings in terms of a catalyst-judging apparatus according to an embodiment of this invention which is incorporated into a double $O_2$-sensor type air-fuel ratio control system. In FIG. 2, in an intake passage 2 coupled to an engine body 1 there are provided an airflow meter 3 and an fuel injection valve 4, and in an exhaust passage 5 coupled thereto there are in order from its upstream side provided an upstream-side $O_2$ sensor 7, a catalytic converter 6 and a downstream-side $O_2$ sensor 8. The output signals of the airflow meter 3, upstream-side $O_2$ sensor 7 and downstream-side $O_2$ sensor are arranged to be supplied to a control unit 9 comprising a well-known microcomputer equipped with a central processing unit (CPU), a random-access memory (RAM), a read-only memory (ROM) and others. The catalytic converter 6 is composed of a catalytic converter rhodium which is capable of simultaneously purifying three harmful components of the exhaust gas, i.e., HC, CO and NOX. The $O_2$ sensors 7 and 8 respectively output to the control unit 9 voltage signals showing binary variations in accordance with the concentration of an oxygen component of the exhaust gas, more specifically in accordance with whether the air-fuel ratio is in the lean or rich side with respect to the theoretical air-fuel ratio (see FIG. 3).

The control unit 9 periodically receives the output signal of the airflow member 3, or receives it in response to a predetermined signal, so as to determine a basic fuel injection amount on the basis of the value of the received signal. In addition, the control unit 9 performs a feedback control operation on the basis of the output signal of the upstream-side $O_2$ sensor 7 to correct the basic fuel injection amount so that the air-fuel ratio becomes coincident with the theoretical air-fuel ratio and further performs correction of a coefficient for feedback control of the upstream-side $O_2$ sensor 7 on the basis of the output signal of the upstream-side $O_2$ sensor 8 in order to compensate for the property deterioration of the upstream-side $O_2$ sensor 7. Moreover, the control unit 9 operates the fuel injection valve 4 so as to supply the intake passage 2 with fuel of the amount corresponding to the double-corrected basic injection amount, thereby always keeping the theoretical air-fuel ratio.

Figure 4:
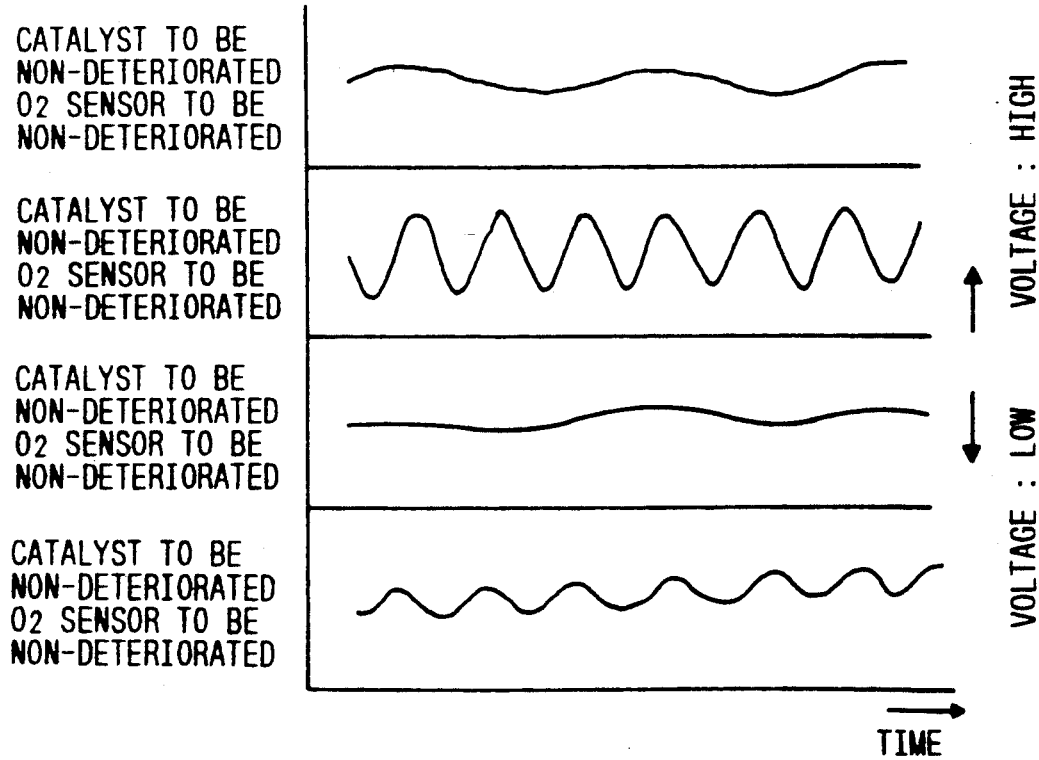
FIG. 4 is an illustration of waveforms of the output signal of an $O_2$ sensor.

FIG. 4 shows one example of variation of the output signal (signal waveform) of the downstream-side $O_2$ sensor 8 in cases where the catalyst is in the non-deteriorated state and the downstream-side $O_2$ sensor 8 is in the non-deteriorated state, in case where the catalyst is in the deteriorated state and the sensor 8 is in the non-deteriorated state, in cases where the catalyst is in the non-deteriorated state and the sensor 8 is in the deteriorated state, and in cases where the catalyst is in the deteriorated state and the sensor 8 is in the deteriorated state. As obvious from FIG. 4, even if the catalyst is in the deteriorated state, in the case that the downstream-side $O_2$ sensor 8 is in the non-deteriorated state, the amplitude of the output signal of the downstream-side $O_2$ sensor 8 is large, and in the case that it is in the deteriorated state, the amplitude thereof is small. Thus, difficulty can be encountered to make the judgment of the catalyst in terms of deterioration when the downstream-side $O_2$ sensor is in the deteriorated state. Here, in the air-fuel ratio feedback control operation, the signal waveforms as illustrated in FIG. 4 can be obtained due to a response characteristic of the feedback control system, and when the catalyst is still in the non-deteriorated state, the absolute value of the $O_2$ concentration to be detected by the downstream-side $O_2$ sensor 8 becomes decreased whereby the amplitude of the signal waveform also becomes small.

Figure 5:
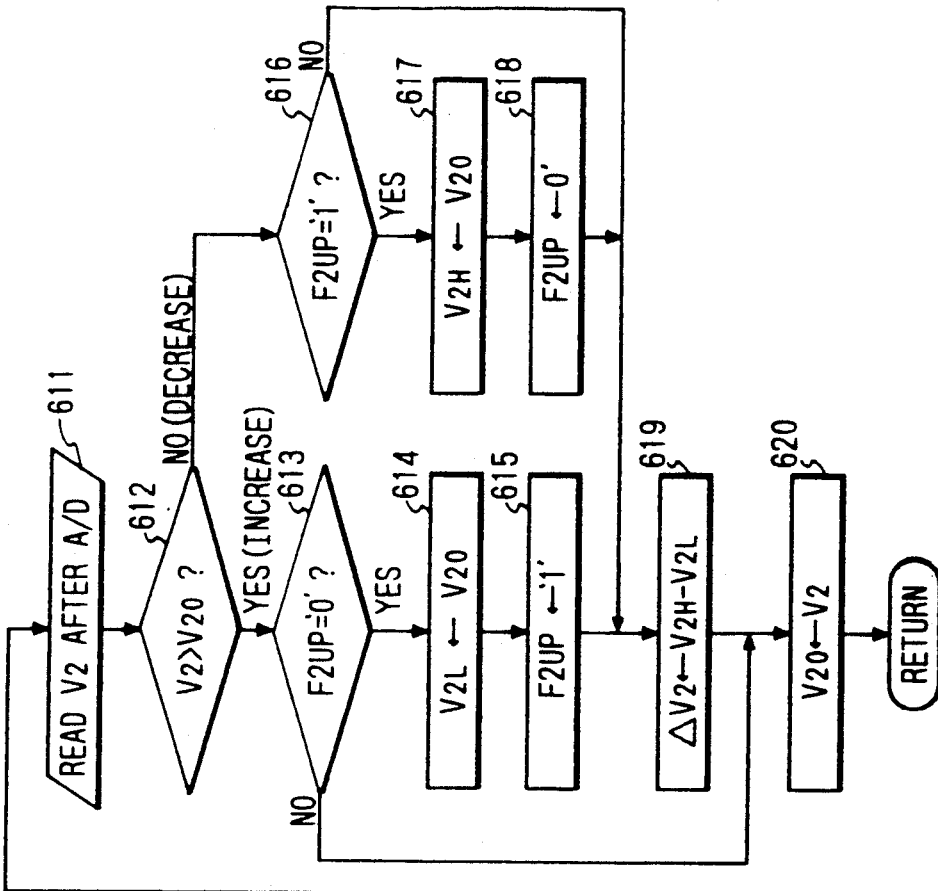
FIG. 5 is a flow chart showing a routine for calculating the signal amplitudes of $O_2$ sensors provided at an upstream and downstream of a catalytic converter.
Figure 5:
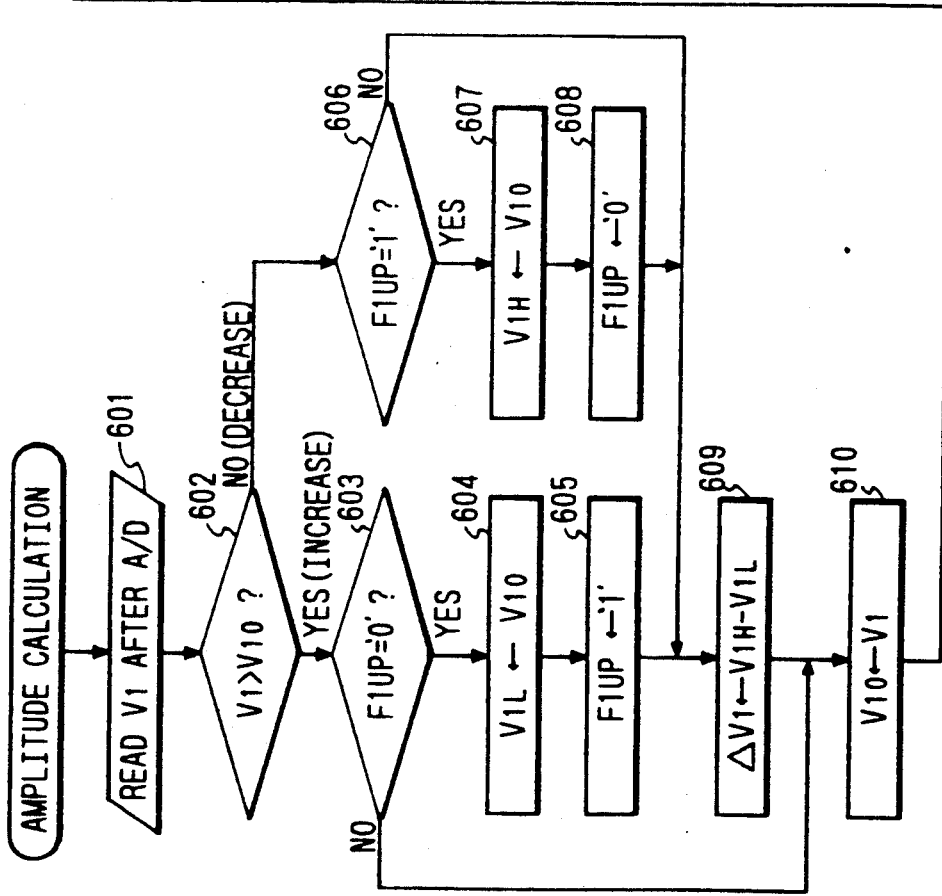
Figure 6:
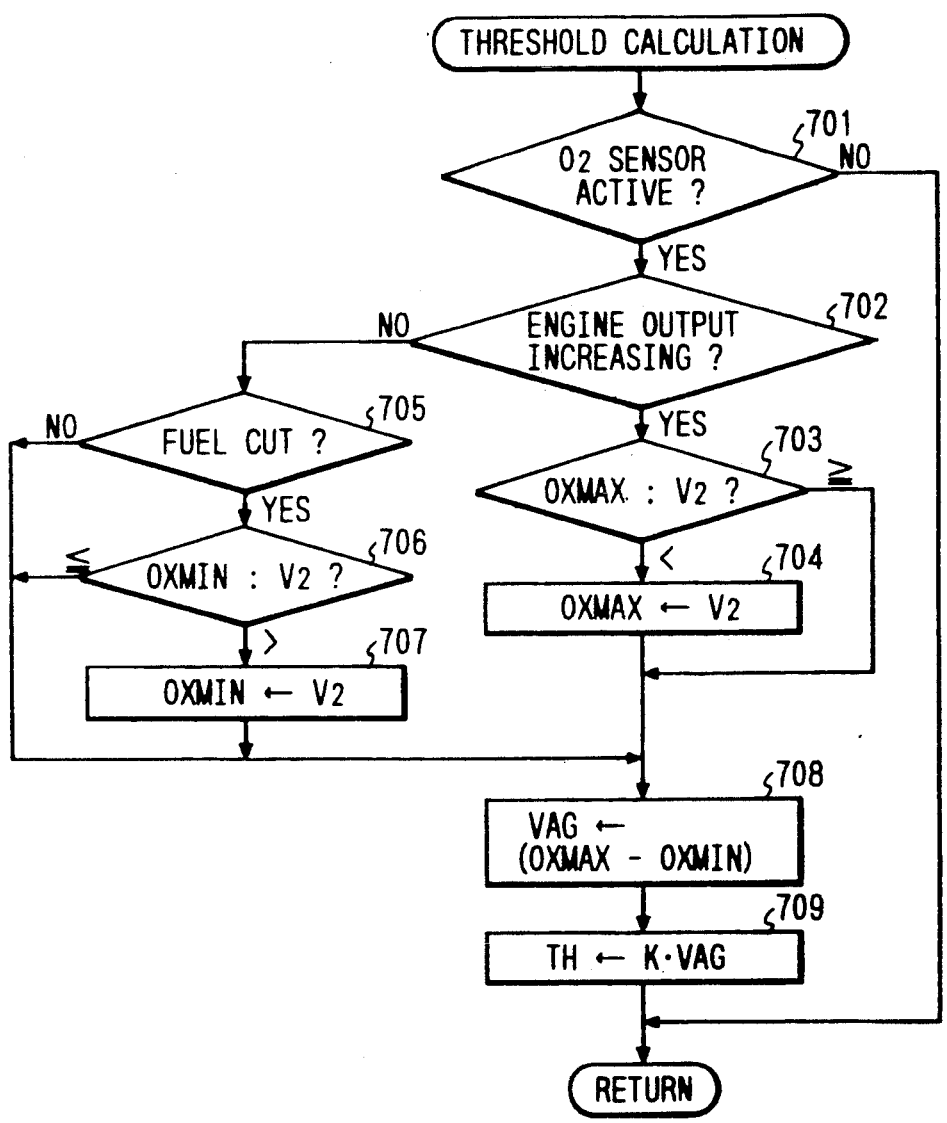
FIG. 6 is a flow chart showing a routine for calculating a judgment threshold for detection of catalyst deterioration.
Figure 7:
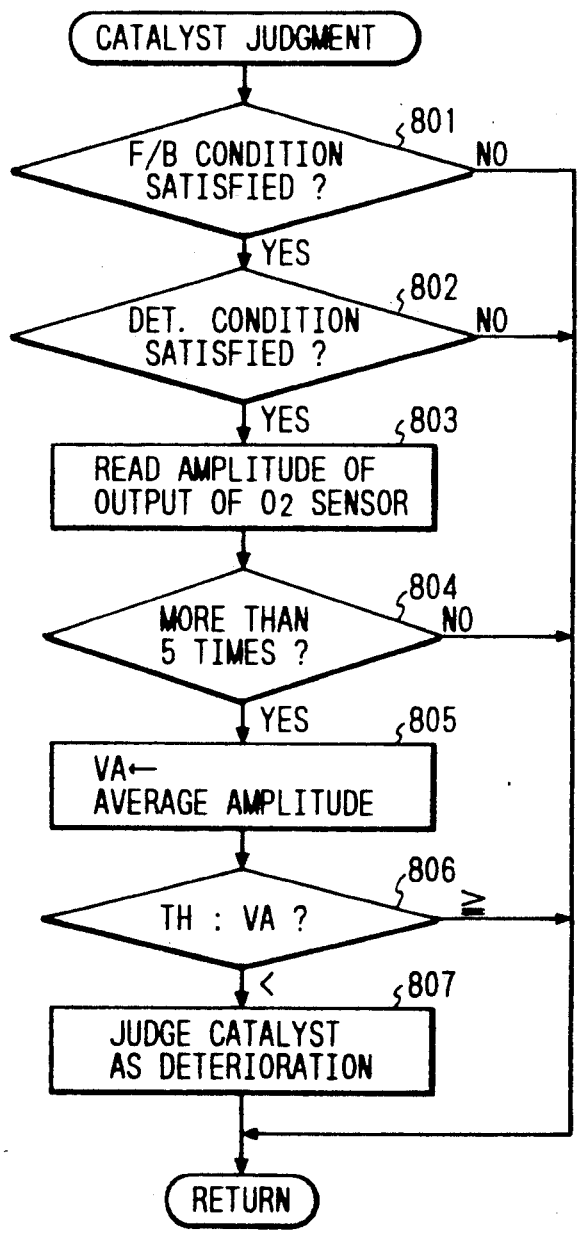
FIG. 7 is a flow chart showing a routine for judgment in terms of catalyst deterioration.

Operation of the judgment apparatus according to this invention will be described hereinbelow with reference to flow charts of FIGS. 5 to 7.

First, an operation (routine) for calculating the signal amplitudes of the $O_2$ sensors 7 and 8 will be described with reference to FIG. 5. In FIG. 5, steps 601 to 610 are for the upstream-side $O_2$ sensor 7 and steps 611 to 620 are for the downstream-side $O_2$ sensor 8. The operation starts with the step 601 to read the output V1 of the upstream-side $O_2$ sensor 7 after analog-to-digital-converted, then followed by the step 602 to compare the previous read value $V_{10}$ of the output of the upstream-side $O_2$ sensor 7 with the currently read value $V_1$ thereof. If $V_1 > V_{10}$ (representing the increase), the step 603 follows to check whether a flag FIUP shows 0. On the other hand, if $V_1 \leq V_{10}$ (representing the decrease), the step 606 follows to check whether the flag FIUP is 1. Here, the flag FIUP=1 represents that the output $V_1$ of the upstream-side $O_2$ sensor 7 is increasing. Thus, in the step 603 the flag FIUP=0 means that the output $V_1$ turns from the decreasing state to the increasing state and the flag FIUP=1 means that the output $V_1$ is continuously in the increasing state. On the other hand, in the step 606 the flag FIUP=1 means that that the output $V_1$ turns from the increasing state to the decreasing state and the flag FIUP=0 means that the output $V_1$ is continuously in the decreasing state.

If the output $V_1$ of the upstream-side $O_2$ sensor 7 is continuously in the increasing state, the operation advances to the step 610, and if being continuously in the decreasing state, the operation goes to the step 609. Moreover, when the output $V_1$ of the upstream-side $O_2$ sensor 7 turns from the decreasing state to the increasing state, the operational flow proceeds to the steps 604, 605 and 609. That is, in the step 604 the minimum value $V_1L$ of the output $V_1$ is calculated to be $V_1L = V_{10}$ and in the step 605 the flag FIUP is reversed, thereafter followed by the step 609 where the amplitude $\Delta V_1$ of the output $V_1$ of the upstream-side $O_2$ sensor 7 is set to $V_1H - V_1L$. Here, the value $V_1H$ is calculated on the basis of the maximum value of the output V1 of the upstream-side $O_2$ sensor 7. On the other hand, when the output $V_1$ of the upstream-side $O_2$ sensor 7 turns from the increasing state to the decreasing state, the operational flow advances to the steps 607, 608 and 609. That is, the step 607 is executed so as to obtain the maximum value of the output $V_1$ with the value $V_1H$ being set to the value $V_{10}$, then followed by the step 608 to reverse the flag FIUP. Further, the step 609 is executed so as to calculate the amplitude $\Delta V_1$ of the output $V_1$ of the upstream-side $O_2$ sensor 7. Similarly, the operational flow of the steps 611 to 620 executes the calculation of the amplitude $\Delta V_2$ of the output $V_2$ of the downstream-side $O_2$ sensor 8, before returning to the main routine.

Secondly, a description will be made hereinbelow in terms of calculating the judgment threshold for detection of the catalyst deterioration with reference to FIG. 6. In FIG. 6, the operation begins with a step 701 to check whether the downstream-side $O_2$ sensor 8 is in the deteriorated state, that is, whether it is active. This is executed by checking whether the output level of the downstream-side $O_2$ sensor 8 varies up and down by a predetermined output level. That is, in cases where the downstream-side $O_2$ sensor 8 is not in the deteriorated state, since as the result of the feedback control the $O_2$ concentration downstream of the catalytic converter 6 substantially waves about a predetermined critical $O_2$ concentration (corresponding to the fact that the output level of the downstream-side $O_2$ sensor 8 operable adequately is 0.5 V, for example), it is possible to decide whether the output level of the downstream-side $O_2$ sensor 8 is variable (or active) on the basis of the $O_2$ concentration variation under the condition that in the normal operation an $O_2$ concentration value (corresponding to the fact that the output level of the downstream-side $O_2$ sensor 8 operable adequately is 0.3 V, for example) which is slightly shifted from the critical $O_2$ concentration is set to the above-mentioned predetermined output level. That is, the up-and-down variation of the output level of the downstream-side $O_2$ sensor 8 by the predetermined output level can be decided by checking whether the output of the downstream-side $O_2$ sensor 8 is smaller than 0.3 V or is greater than 0.5 V.

Figure 3:
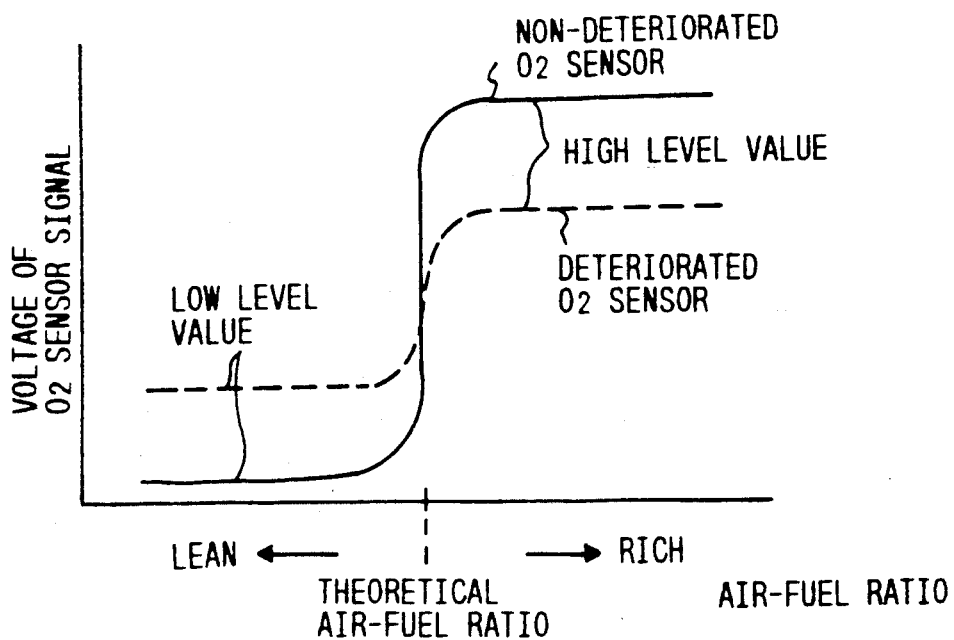
FIG. 3 is an graphic diagram showing the relationship between the output signal of an $O_2$ sensor and an air-fuel ratio.

A subsequent step 702 is executed so as to check whether the engine output is increasing. In cases where the engine output is continuously in the increased state, since the air-fuel ratio can substantially be considered to be always at the rich side, the output of the downstream-side $O_2$ sensor 8 takes a high level as illustrated in FIG. 3. In addition, if the air-fuel ratio is richened by a value equal to or greater than a predetermined value as compared with the theoretical air-fuel ratio, this high level substantially corresponds to the maximum-side saturated level and hence becomes constant whereby there is no effect to the catalyst deterioration. Here, it is also appropriate that the step 702 is executed so as to detect the fact that the throttle valve is in the fully opened state, instead of detecting the fact that the engine output is in the increased state.

If the answer of the step 702 is affirmative (increase in the engine output), a step 703 follows to compare the value $V_2$ of the output signal of the downstream-side $O_2$ sensor 8 with the maximum value OXMAX thereof to be recorded. If the maximum value OXMAX is greater than the output signal value $V_2$, the step 703 is directly followed by a step 708. On the other hand, if it is smaller than the output signal value $V_2$, a step 704 follows to set the output signal value $V_2$ to the maximum value OXMAX, before followed by the step 708. On the other hand, if the answer of the step 702 is negative, a step 705 follows to check whether the supply of fuel to the engine is in the fuel-cut state. If in the fuel-cut state, since the air-fuel ratio can be considered to be at the lean side, the output level of the downstream-side $O_2$ sensor 8 takes a low level as illustrated in FIG. 3. In addition, if the air-fuel ratio is more lean by above a predetermined degree as compared with the theoretical air-fuel ratio, this low level substantially corresponds to the minimum-side suturated level and hence becomes constant whereby there is no effect to the catalyst deterioration.

If the answer of the step 705 is affirmative (the fuel-cut state), a step 706 follows to compare the value $V_2$ of the output signal of the downstream-side $O_2$ sensor 8 with the minimum value OXMIN thereof to be recorded. If the minimum value OXMIN is below the output signal value $V_2$, the operational flow directly goes to the step 708. On the other hand, if the minimum value OXMIN is greater than the output signal value $V_2$, a step 707 follows to set the output signal value $V_2$ to the minimum value OXMIN, thereafter followed by the step 708. The step 708 is for obtaining the difference VAG between the minimum value and the maximum value recorded or updated at present time. After the execution of the step 708, a step 709 is executed so as to multiply the difference VAG by a predetermined magnification K to obtain a judgment threshold TH for the detection of the catalyst deterioration.

Further, a description will be made hereinbelow with reference to FIG. 7 in terms of operation for performing the judgment with respect to the catalyst deterioration. In FIG. 7, the operation starts with a step 801 so as to check whether the internal combustion engine is under the air-fuel ratio feedback control due to the downstream-side $O_2$ sensor 8, i.e., under the closed-loop condition. This initial step 801 substantially corresponds to a step 901 which will be described hereinafter with reference to FIG. 8. If satisfying the closed-loop condition, the step 801 is followed by a step 802 to check whether the condition for detection of the catalyst deterioration is satisfied. Here, the condition for the detection of the catalyst deterioration means that the engine speed and the engine load respectively take the normal levels and the engine is in the normal state (for example, the motor vehicle including the engine is running at a speed of 60 Km/h). A step 803 follows to successively read the amplitude of the output OXR of the downstream-side $O_2$ sensor 8 for a predetermined time period, further followed by a step 804 to check whether the reading of the output OXR amplitude is performed 5 or more times. If the answer of the step 804 is affirmative, a step 805 is executed in order to calculate the average VA of the read output amplitudes, then followed by a step 806 to compare the judgment threshold TH with the average amplitude VA. If the average amplitude VA is greater than the judgment threshold TH, a step 807 follows to decide that the catalyst is in the deteriorated state. If not, the operational folow returns to the main routine.

Figure 8:
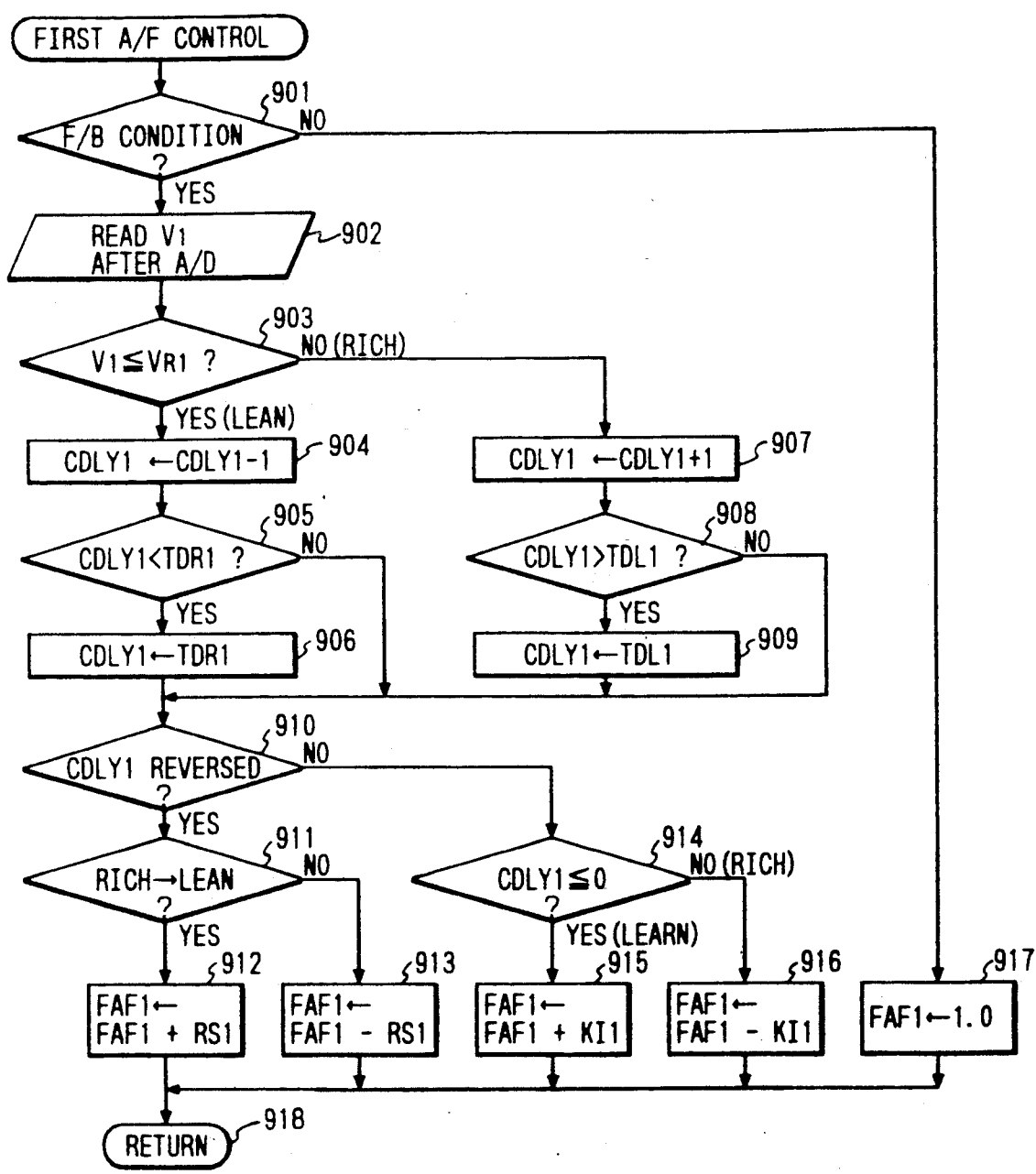
FIG. 8 is a flow chart showing execution of air-fuel ratio feedback control due to the upstream-side $O_2$ sensor.

A description will be described hereinbelow with reference to FIG. 8 in terms of air-fuel ratio feedback control for calculating an air-fuel ratio correction coefficient FAF1 on the basis of the output of the upstream-side $O_2$ sensor 7. In FIG. 8, the operation starts with the step 901 to check whether the air-fuel ratio closed-loop (feedback) condition is satisfied. Here, the closed-loop condition can be satisfied in cases where the engine is in the starting state, the supply of the fuel to the engine after the start is in the increasing state, the engine power is in the increasing state, the engine is under the lean control, for instance. If not satisfying the closed-loop condition, the operation advances to a step 917 to set the air-fuel ratio correcting coefficient FAF1 to 1.0. On the other hand, if satisfying the closed-loop condition, a step 902 follows to read the output $V_1$ of the upstream-side $O_2$ sensor 7, then followed by a step 903 to compare the read output $V_1$ with a comparison voltage $VR_1$, i.e., determine whether the air-fuel ratio is rich or lean side. If the air-fuel ratio is at the lean side ($V1 \leq VR_1$), a step 904 follows to subtract 1 from the value of a delay counter CDLY1, then followed by steps 905 and 906 so as to guard the delay counter CDLY1 with a minimum value TDR1. On the other hand, if in the step 903 the air-fuel ratio is at the rich side ($V1 > VR_1$), a step 907 follows to add 1 to the delay counter CDLY1, then followed by steps 908 and 909 so as to guard the delay counter CDLY1 with a maximum value TDL1. Here, the basic value of the delay counter CDLY1 is set to 0, and when CDLY1 > 0, the air-fuel ratio after the delay process is considered to be rich. On the other hand, when CDLY1 ≤ 0, the air-fuel ratio after the delay process is considered to be lean.

A subsequent step 910 is provided in order to check whether the sign of the delay counter CDLY 1 is reversed, i.e., check whether the air-fuel ratio after the delay process is reversed. If reversed, a step 911 is executed to check whether the reversing of the air-fuel ratio is made from the rich state to the lean state or from the lean state to the rich state. If the reversing is from the rich state to the lean state, a step 912 is executed such that the air-fuel ratio correcting coefficient FAF1 is increased by a constant value RS1, that is, FAF1 = FAF1 + RS1. On the other hand, the reversing is from the lean state to the rich state, a step 913 is executed such that the FAF1 is skipped to be decreased by the RS1, that is, FAF1 = FAF1 − RS1. If the answer of the step 910 is negative, the operational flow goes to steps 914, 915 and 916 to perform the integrating process. More specifically, the step 914 is executed to check whether CDLY1 < 0. If CDLY1 ≤ 0 (lean), the step 915 follows to set FAF1 = FAF1 + K11 where K11 is an integration constant. On the other hand, if CDLY1 > 0 (rich), the step 916 follows to set FAF1 = FAF1 − K11. Here, the integration constant K11 is arranged to be sufficiently smaller as compared with the constant RS1. Thus, the step 915 is for gradually increasing the fuel injection amount when the air-fuel ratio is in the lean state (CDLY1 ≤ 0), and the step 916 is for gradually decreasing the fuel injection amount when the air-fuel ratio is in the rich state (CDLY1 > 0). That is, the fuel injection amount is primary-controlled on the basis of the air-fuel ratio correcting coefficient FAF1 determined in the above-mentioned steps 912 to 917.

Figure 9:
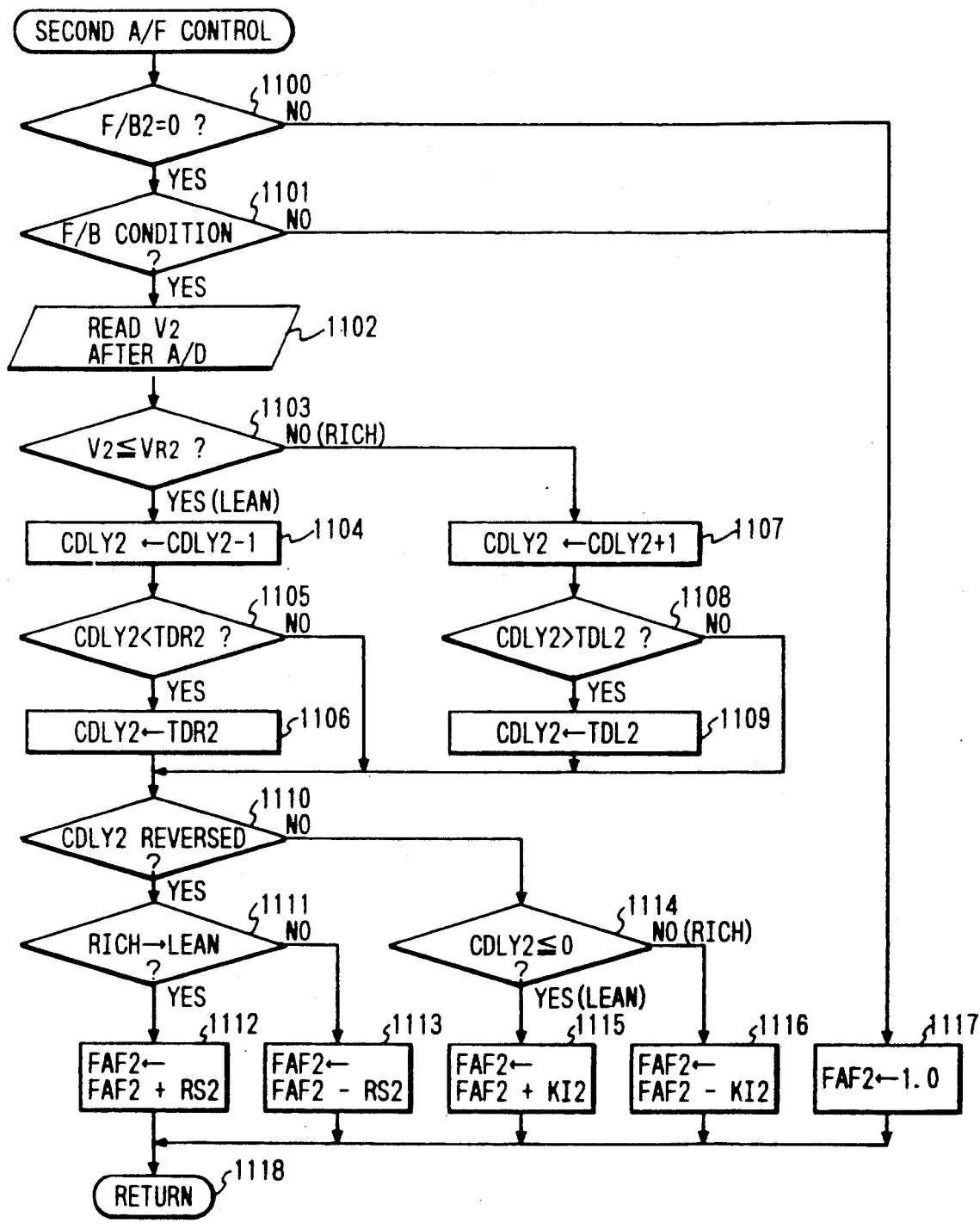
FIG. 9 is a flow chart showing execution of air-fuel ratio feedback control due to the downstream-side $O_2$ sensor.

Still further, a description will be made hereinbelow with reference to FIG. 9 in terms of a double O₂-sensor air-fuel ratio control operation based on a second air-fuel ratio correcting coefficient FAF2. The operation begins with a step 1100 to check, through a flag F/B2, whether or not the catalyst of the catalytic converter 6 is in the deteriorated state (the routine illustrated in FIG. 7). When the catalyst is in the deteriorated state, in the step 807 (FIG. 7) the flag F/B2 is set to 1. In this case, the step 1100 is followed by a step 1117 where the second air-fuel ratio correcting coefficient FAF2 is set to 1.0. If the answer of the step 1100 is affirmative (F/B2 = 0), a step 1101 follows to check whether the close-loop condition due to the downstream-side O₂ sensor 8 is satisfied. This step substantially corresponds to the step 901 illustrated in FIG. 8. If not satisfying the closed-loop condition, the operational flow goes to the aforementioned step 1117 to set FAFA2 = 1.0. If satisfying the closed-loop condition, the operation advances to a step 1102. The step 1102 is provided so as to read the output $V_2$ of the downstream-side O₂ sensor 8 to be analog-to-digital-converted, thereafter followed by a step 1103 to compare the output V2 with the comparison voltage $VR_1$, i.e., to check whether the air-fuel ratio is in the rich or in the lean state. If in the lean state, a step 1104 follows to calculate a second delay counter CDLY2 (CDLY2 − 1), then followed by steps 1105 and 1106 to guard the delay counter CDLY2 with a minimum value TDR2. On the other hand, if in the rich state, a step 1107 follows to add 1 to the delay counter CDLY2, thereafter followed by steps 1108 and 1109 to guard the delay counter CDLY2 with a maximum value TDL2. Here, the basic value of the second delay counter CDLY2 is set to 0, and when CDLY2 > 0, the air-fuel ratio after the delay process is regarded as being in the rich state, and when on the other hand CDLY2 ≤ 0, the air-fuel ratio after the delay process is considered as being in the lean state.

A step 1110 is provided in order to check whether the sign of the delay counter CDLY2 is reversed, i.e., check whether the air-fuel ratio after the delay process is reversed. If the air-fuel ratio is reversed, a step 1111 follows to check whether the reversing is made from the rich state to the lean state or from the lean state to the rich state. If from the rich state to the lean state, a step 1112 is executed so as to increase the second air-fuel ratio correcting coefficient FAF2 to become FAF2 = FAF2 + RS2 where RS2 is a constant. On the other hand, if from the lean state to the rich state, a step 1113 is executed so as to decrease the correcting coefficient FAF2 to become FAF2 = FAF2 − RS2. If the answer of the step 1110 is negative (no reversing), the operational folow goes to steps 1114, 1115 and 1116 to perform the integration process. That is, the step 1114 is executed to check whether CDLY2 > 0. If CDLY2 ≤ 0 (lean state), the step 1115 follows to set FAF2 = FAF2 + K12 where K12 is an integration constant. On the other hand, if CDLY2 > 0 (rich state), the step 1116 follows to set FAF2 = FAF2 − K12. Here, the integration constant K12 is arranged to be sufficiently smaller than the constant RS2, that is, K12 < < RS. Accordingly, the step 1111 is for gradually increasing the fuel injection amount in response to the lean state (CDLY2 ≤ 0), and the step 1116 is for gradually decreasing the fuel injection amount in response to the rich state (CDLY2 > 0). As a result, the fuel injection amount is secondary-controlled on the basis of the second air-fuel ratio correcting coefficient FAF2 to be determined in the above-described steps 1112 to 1116. Here, when in the step 1117 the second air-fuel ratio correcting coefficient FAF2 is set to 1.0, the secondary-controlling operation is interrupted.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. An apparatus for judging of a catalyst of a catalytic converter provided in an exhaust system of an internal combustion engine so as to purify an exhaust gas generated from said internal combustion engine, said apparatus comprising:

gas concentration sensor means provided downstream of said catalytic converter to detect a concentration of a specified component of said exhaust gas and output a signal indicative of the detected concentration thereof; and judgment means responsive to the output signal from said gas concentration sensor means to compare a predetermined judgment threshold with an amplitude of the output signal therefrom to detect, on the basis of the comparison result, whether said catalyst of said catalytic converter is in a deteriorated state, said judgment means relatively correcting said predetermined judgment threshold with respect to the output signal from said gas concentration sensor means on the basis of the output signal therefrom under a predetermined air-fuel ratio condition.

2. An apparatus as claimed in claim 1, wherein said predetermined air-fuel ratio condition represents that an air-fuel ratio for said internal combustion engine is in a predetermined rich state.

3. An apparatus as claimed in claim 2, wherein said predetermined rich state is taken when an output of said internal combustion engine is increasing.

4. An apparatus as claimed in claim 1, wherein said predetermined air-fuel ratio condition represents that an air-fuel ratio for said internal combustion engine is in a predetermined lean state.

5. An apparatus as claimed in claim 4, wherein said predetermined lean state is taken when supply of a fuel to said internal combustion engine is stopped.

6. An apparatus for judging of a catalyst of a catalytic converter provided in an exhaust system of an internal combustion engine so as to purify an exhaust gas generated from said internal combustion engine, said apparatus comprising:

gas concentration sensor means provided downstream of said catalytic converter to detect a concentration of a specified component of said exhaust gas and output a signal indicative of the detected concentration thereof; and judgment means responsive to the output signal from said gas concentration sensor means to compare a predetermined judgment threshold with an amplitude of the output signal therefrom to detect, on the basis of the comparison result, whether said catalyst of said catalytic converter is in a deteriorated state, said judgment means relatively correcting said predetermined judgment threshold with respect to the output signal from said gas concentration sensor means on the basis of the difference between the output signal therefrom under the condition that an air-fuel ratio for said internal combustion engine is in a predetermined rich state and the output signal therefrom under the condition that the air-fuel ratio is in a predetermined lean state.

7. An apparatus as claimed in claim 6, wherein said predetermined rich state is taken when an output of said internal combustion engine is increasing, and said predetermined lean state is taken when supply of a fuel to said internal combustion engine is stopped.

* * * * *